United States Patent [19]
Liao

[11] Patent Number: 5,764,493
[45] Date of Patent: Jun. 9, 1998

[54] PALM TOP IMAGE SCANNER BACK LIGHTING DEVICE

[76] Inventor: Chun-Chi Liao, No. 9, Lane 126, Min-Sheng Road, TaiChung City, Taiwan

[21] Appl. No.: 569,952

[22] Filed: Dec. 11, 1995

[51] Int. Cl.⁶ ............................................. F21V 33/00
[52] U.S. Cl. ........................... 362/31; 362/98; 362/216; 358/487
[58] Field of Search ........................ 358/473, 475, 358/487; 362/26–31, 98, 99, 154, 216

[56] References Cited

U.S. PATENT DOCUMENTS

| 3,242,328 | 3/1966 | Kapany et al. | 362/31 |
|---|---|---|---|
| 4,842,378 | 6/1989 | Flasck et al. | 362/31 |
| 4,989,099 | 1/1991 | Koshiyouji et al. | 358/487 |
| 5,207,495 | 5/1993 | Ahlstone | 362/97 |
| 5,239,392 | 8/1993 | Suzuki et al. | 358/487 |
| 5,251,072 | 10/1993 | Fukuoka et al. | 358/487 |
| 5,467,172 | 11/1995 | Liao | 358/487 |
| 5,574,577 | 11/1996 | Wally, Jr. et al. | 358/487 |

FOREIGN PATENT DOCUMENTS

| 224372 | 11/1985 | Japan | 358/487 |
|---|---|---|---|

Primary Examiner—Alan Cariaso
Attorney, Agent, or Firm—Ostrolenk, Faber, Gerb & Soffen, LLP

[57] ABSTRACT

A back lighting device for use with a palm top image scanner includes a body inside which a light generating member is arranged to project light through a window on which a film to be scanned is placed so as to project the image on the film to the image scanner. The window has a frosted surface to support the film thereon so as to eliminate the interference ring occurring therebetween. The window is provided with a circumferential step so as to define a recessed window area for receiving therein a film holding plate, made of a light transmitting material, for firmly holding the film on the window. The film holding plate may also be provided with a frosted surface to avoid the occurrence of the interference ring between the film holding plate and the window. An extension member is provided to connect to the body in an end to end manner so as to provide a greater space for the movement of the image scanner which allows the image scanner to move through the whole area of the film and thus no portion of the image will be lost during scanning. The extension member is also designed to serve as a cover member which releasably engages the back lighting device in such a manner as to shield and protect the window of the back lighting device from being damaged.

17 Claims, 7 Drawing Sheets

PALM TOP IMAGE SCANNER BACK LIGHTING DEVICE

FIELD OF THE INVENTION

The present invention relates generally to an image scanner and in particular to a back-lighting device for use with a palm-top image scanner.

BACKGROUND OF THE INVENTION

Palm top image scanners are usually used to "read" images from photographic films, such as positive films, negative films and/or reversal films. Such films usually have the sizes of 3.5' and 6'. The films can only be read by the scanner by means of light transmission through the films so that a back lighting device is required for the image scanner to read image on the photographic films. In operation, the film is placed on an illuminating window through which light generated by the back lighting device is projected outward so as to project the image of the film to the scanner when the scanner which has a line scanning unit capable to scan a linear area of the film is moved through the whole area of the film.

Due to the small size of the photographic films, it is hard to firmly hold the film on the scanner during the scanning operation and the film may move by the movement of the scanner which results in the image being distorted. Such a distortion or movement causes incorrect reading of the image.

Further, in the conventional back lighting device, only a limited space is provided for the movement of the scanner so that it is not possible for the scanner to cover all the surface area provided by the illuminating window of the back lighting device. In such a case, a certain portion of the film may be missed during the scanning operation and, as a consequence, the image on the missed portion of the film is lost.

In addition, in the conventional back lighting device, the illuminating window is provided with a smooth surface on which a film, also having a smooth surface, is placed. Due to an contact between two smooth surfaces, the interference ring phenomenon may occur when scanning light goes through the surface. This causes a distortion in color scanning.

It is therefore desirable to provide a back lighting device to be used with a palm top image scanner which overcomes the drawbacks associated with the conventional back lighting device.

SUMMARY OF THE INVENTION

An object of the present invention is to provide a back lighting device for use with a palm top image scanner to scan for example photographic films where a step is formed around the illuminating window on which the film to be scanned is placed to receive therein a film holding plate for firmly holding the film on the illuminating window without movement or distortion during the scanning operation.

Another object of the present invention is to provide a back lighting device for use with a palm top image scanner where the illuminating window has a frosted surface for contacting the film to be scanned so as to eliminate the interference ring occurring therebetween.

It is a further object of the present invention to provide a back lighting device where the film holding plate is also provided with a frosted surface for contacting the frosted surface of the illuminating window to sandwich the film to be scanned therebetween such that the frosted surface eliminates any interference ring between the film or the holding plate and the illuminating window.

It is a further object of the present invention to provide a back lighting device for use with a palm top image scanner, comprising a cover member which is releasably engageable with the back lighting device for shielding and protecting the illuminating windows from being damaged and is also designed to connect to one end of the back lighting device in a side by side manner to serve as an extension of the back lighting device for provision of a greater space for the movement of the image scanner in order to completely scan through the whole area of the film to be scanned.

In accordance with the present invention, there is provided a back lighting device for use with a palm top image scanner comprising a body inside which a light generating member is arranged to project light through a window on which a film to be scanned is placed so as to project the image on the film to the image scanner. The window has a frosted surface to support the film thereon so as to eliminate the interference ring occurring therebetween. The window is provided with a circumferential step so as to define a recessed window area for receiving therein a film holding plate, made of a light transmitting material, for firmly holding the film on the window. The film holding plate may also be provided with a frosted surface to avoid the occurrence of the interference ring between the film holding plate and the window. An extension member is provided to connect to the body in an end to end manner so as to provide a greater space for the movement of the image scanner which allows the image scanner cover the whole area of the film and thus no image will be lost during scanning. The extension member is also designed to serve as a cover member which releasably engages the back lighting device in such a manner to shield and protect the window of the back lighting device from being damaged.

BRIEF DESCRIPTION OF THE DRAWINGS

The present invention will be better understood from the following description of preferred embodiments thereof, with reference to the attached drawings, wherein.

DETAILED DESCRIPTION OF THE PREFERRED EMBODIMENTS

Figure 1:
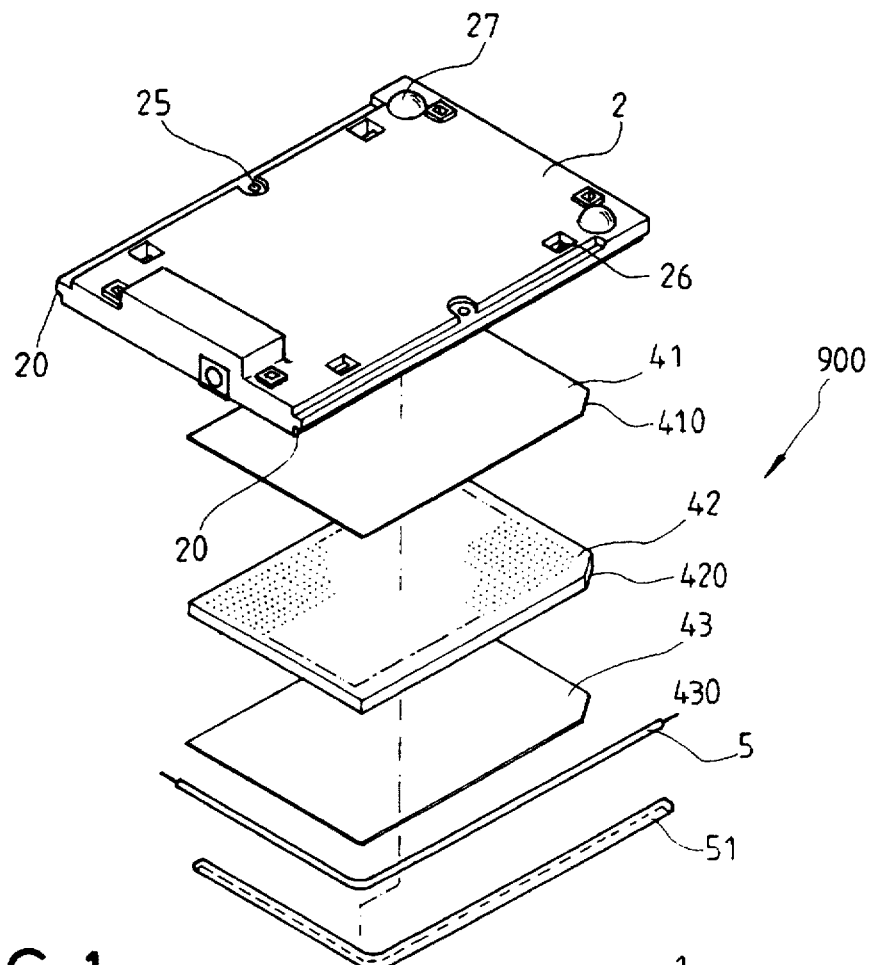
FIG. 1 is an exploded perspective view showing a back lighting device constructed in accordance with a first embodiment of the present invention.
Figure 1:
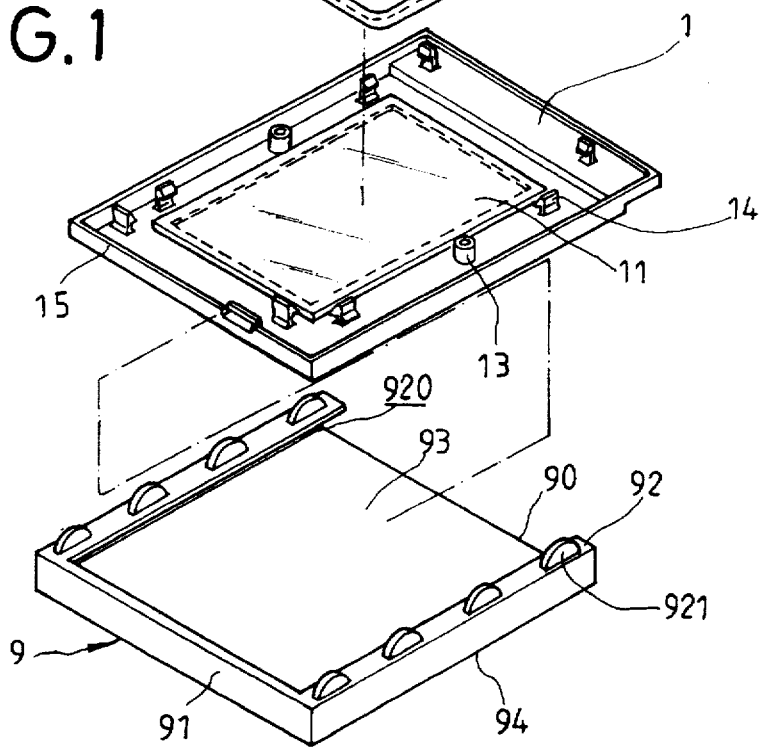
Figure 5:
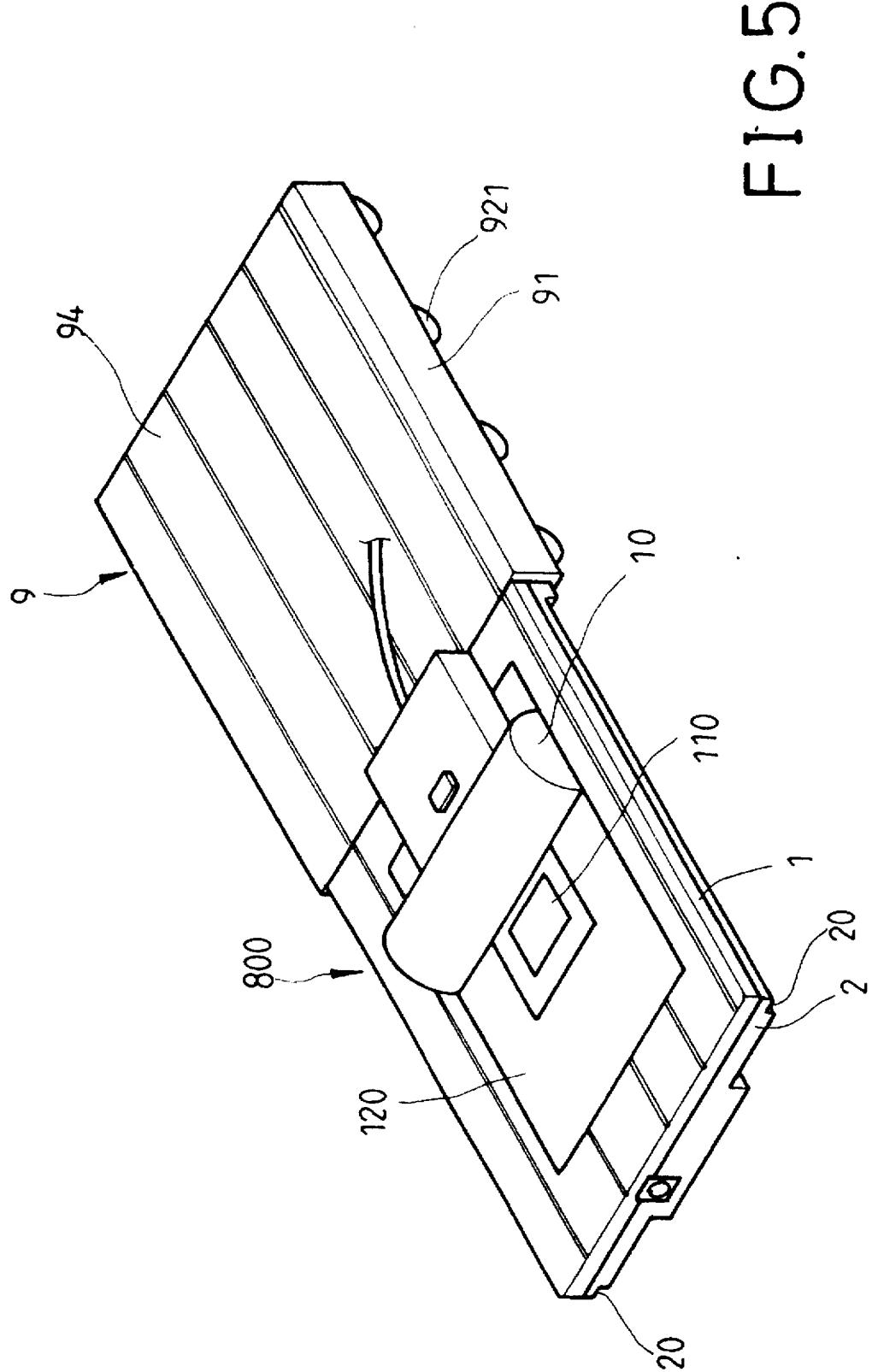
FIG. 5 is a perspective view showing the operation of an image scanner on the back lighting device of the present invention for scanning a film.
Figure 6:
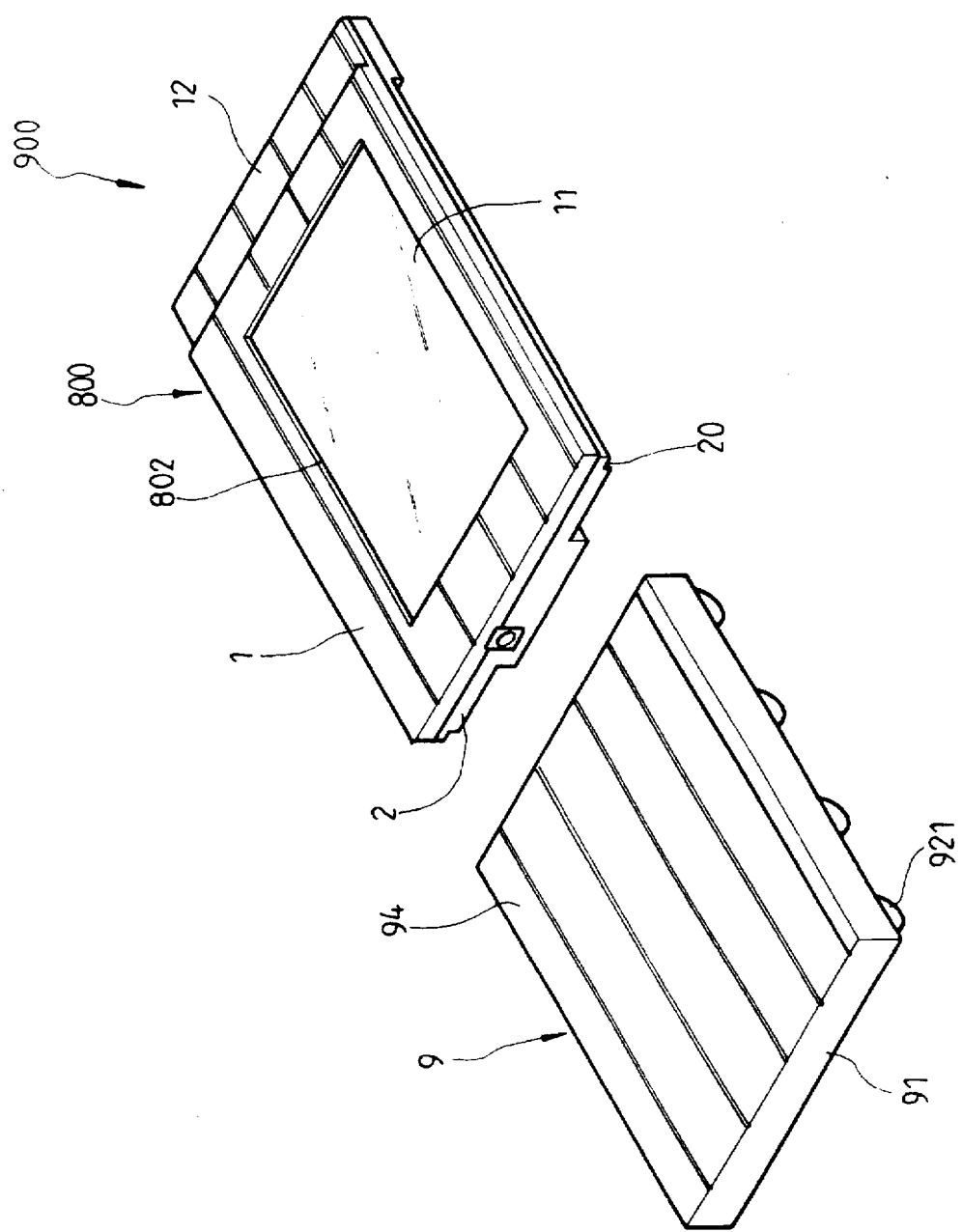
FIG. 6 is a perspective view showing how the back lighting device is received within the cover.

With reference to FIG. 1, shown is a back lighting device constructed in accordance with the present invention, and generally designated with the reference numeral 900. The back lighting device 900 is adapted to be used with a palm top image scanner 10 (FIG. 5) to scan an image recorded on a transparent medium, for example a photographic film 110 (see FIG. 5), such as a positive film or a negative film. The back lighting device 900 is provided with an illuminating window 11 to support the film 110 thereon and generates uniform light through the illuminating window 11 as well as the film 110 so as to project the image on the film to the image scanner 10. The light through the film 110 projects the image on the film 110 toward the image scanner 10 when the scanner 110 is moved through the illuminating window 11 so as to allow the image scanner 10 to perform a scanning operation on the film 110.

The back lighting device 900 comprises a casing 800 (see FIG. 5) constituted by a first casing member 1 and a second casing member 2 to be mounted together to define therebetween an interior space for receiving therein a light generating means and a light diffusing means to be described hereinafter.

To secure the first casing member 1 to the second casing member 2, the first casing member 1 is provided with a plurality of paw-like retaining pieces 14 having barbed ends, fixed inside the first casing member 1 to be inserted into and through a plurality of retaining holes 26 formed on the second casing member 2 to hook on edges of the holes 26 so as to temporarily secure the first casing member 1 to the second casing member 2. Screws 27 are also provided to extend through holes 25 formed on the second casing member 2 to engage inner-threaded holes 13 formed on the first casing member 1 so as to more securely mount the second casing member 1 to the first casing member 1. Other means for securing the two casing members 1 and 2 together will also work, such as adhesive, ultra-sonic bonding or bayonet engagement.

The first casing member 1 is in the form of a shallow panel having an inner surface and an outer surface with side wall segments 15 mounted to the inner surface to be substantially normal thereto. In the embodiment illustrated, the first casing member 1 has the shape of rectangle having four side wall segments 15 mounted to the inner surface thereof. The first casing member 1 has an opening formed therein which is substantially centered. A light transmission plate is attached to the inner surface of the first casing member 1 to serve as the illuminating window 11 which allows the light generated by the light generating means to project therethrough for the scanning operation.

The back lighting device 900 of the present invention is provided with an invertor 3 which receives power from an external power supply (not shown) and converts and transmits the external power to the light generating means to actuate the light generating means. Further, although not explicitly illustrated, it is understood that a control circuit, as well as control switch, is provided to control the operation of the back lighting device 900.

Figure 2:
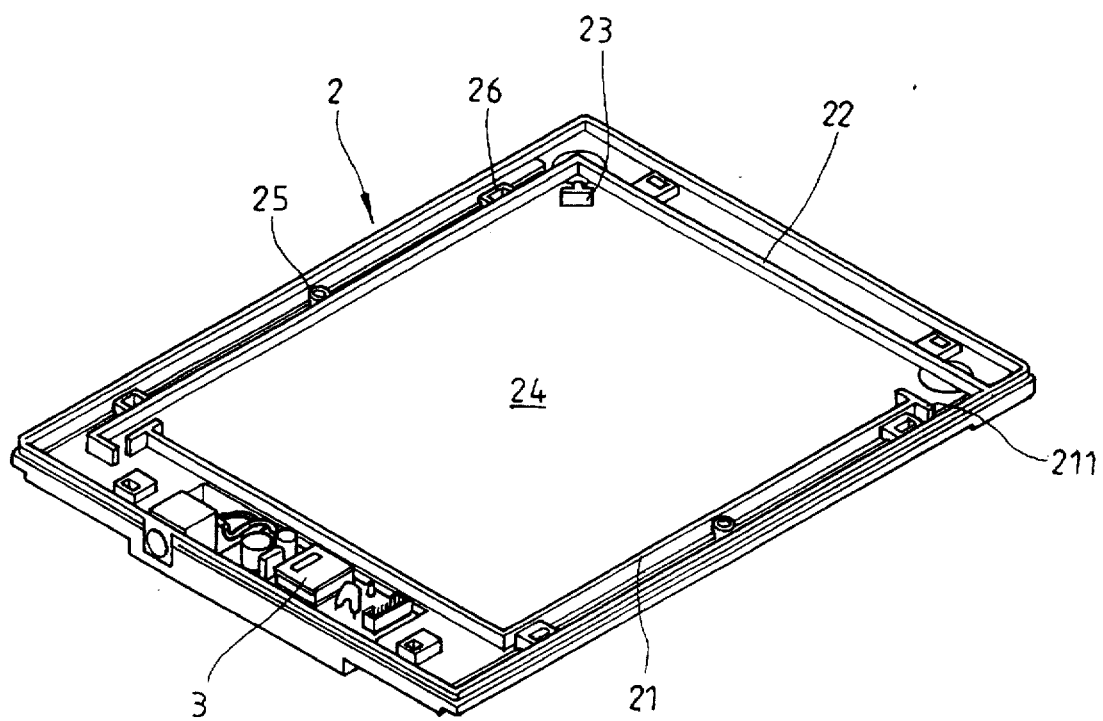
FIG. 2 is a perspective view, observed from a direction opposite to FIG. 1, of the second casing member of the back lighting device of FIG. 1.

Also referring to FIG. 2 which shows a perspective view of the second casing member 2 viewed in an up-side-down manner with respect to FIG. 1, the second casing member 2 comprises a shallow panel like member having a substantially flat bottom 24 on which wall segments 21, 22 and 23 are provided to define a space for receiving therein the light diffusing means which in the embodiment illustrated comprises a reflective plate 41, a light guide plate 42 and a light diffusion plate 43 to be disposed into the space defined by the wall segments 21, 22 and 23 in sequence.

When viewed in accordance with the orientation of FIG. 2 which is exactly opposite to that of FIG. 1, the reflective plate 41 is disposed directly on the bottom 24 of the second casing member 2 for reflecting light projecting toward the bottom 2 back to the illuminating window 11. The light guide plate 42 is arranged on the reflective plate 41 for uniformly distributing the light generated by the light generating means through the whole area of the illuminating window 11. The light guide plate 42 preferably has a frosted surface. The diffusion plate 43 is then placed on the light guide plate 42 for a more uniform distribution of light through the whole area of the illuminating window 11. The illuminating window 11 is thus located above the light diffusion plate 43 so that the uniform light through the light diffusion plate 43 is permitted to propagate through the illuminating window 11.

The light generating means comprises at least one elongated tubular illuminating member 5, such as cold cathode fluorescent lamp. In the embodiment illustrated in FIG. 1, the illuminating member 5 is in the form of an "L" fixed inside the second casing member 2. To securely hold the L-shaped illuminating member 5 within the second casing member 2, the wall segments 21, 22 and 23 are arranged in such a manner that, as illustrated in FIG. 2, the wall segment 22 takes the form of an "L" having two limbs defining a connection corner and two ends. The wall segment 23 takes the form of a "T" having a shank pointing toward the corner of the L-shaped wall segment 22 and a head extending between the limbs of the L in an inclined manner to as to leave gaps between the L and the T which allow corner portion of the L-shaped illuminating member 5 to be inserted and retained. The wall segment 21 comprises two end tabs 211 extending substantially parallel with the two limbs of the wall segment 22 to define gaps between the end tabs 211 and the ends of the L-shaped wall segment 22 for receiving and retaining therein the ends of the L-shaped illuminating member 5.

A light reflection member 51, preferably made of a material of high light reflectivity, such as an aluminum foil, having a U-shaped section is disposed between the L-shaped illuminating member 5 and the L-shaped wall segment 22 and partially encasing the illuminating member 5 in order to reflect the light coming toward the wall segment 22 back to the light diffusion means located centrally on the second casing member 2 to increase the illumination efficiency.

The wall segment 21 may also be shaped in the form of an "L" having two limbs substantially opposite to the two limbs of the wall segment 22 to define therebetween a substantially rectangular space for receiving the reflective plate 41, the light guide plate 42 and the light diffusion plate 43 so as to allow the light generated by the illuminating member 5 to be substantially conducted toward the illuminating window 11.

To accommodate the T-shaped wall segment 23, the reflective plate 41, the light guide plate 42 and the light diffusion plate 43 are all provided with a chamfer 410, 420 or 430.

The present invention also provides a cover 9 which comprises a body 90 having a first surface 94 which is substantially flat and an opposite second surface 93. A pair of opposite and spaced walls 92 are provided on the second surface 93 to define therebetween a space for receiving the back lighting device 900 therein in a stowed condition. Each of the walls 92 is provided with a slot 920 facing each other to engage one of two opposite reduced lateral side edges 20 of the casing 800 of the back lighting device 900 which are provided on the second casing member 2 to retain the back lighting device 900 therein in such a manner that the illuminating window 11 is facing and shielded by the second surface 93 of the cover 9. A stop member 91 is also provided on the second surface 93 to constrain the back lighting device 900 between the two walls 92.

The walls 92 may have a plurality of semi-circular projections 921 serving as supports.

In accordance with the present invention, the casing 800 of the back lighting device 900 is provided with a recessed section 12 on one longitudinal end thereof so as to allow the recessed section 12 to be partially inserted between the two slotted walls 92, allowing the outer surface of the first casing member 1 to be substantially flush with the first surface 94 of the cover 9 in an operation condition. With such an arrangement, the cover 9 serves as an extension of the casing 800 of the back lighting device 900 for supporting the movement of the image scanner 10 in order for performing a more thorough scanning operation of the recording medium 110 (see FIG. 5) placed on the illuminating window 11.

Figure 7:
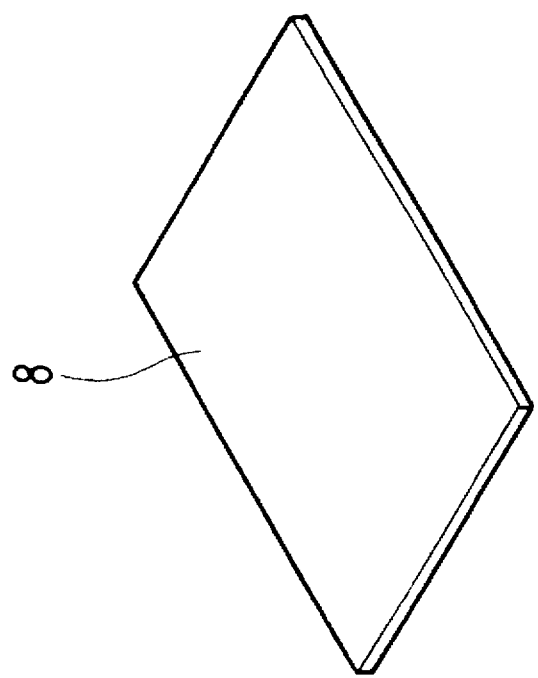

The illuminating window 11 which is formed by attaching a light transmitting plate to the centered opening formed on the first casing member 1 defines a step 802 around the opening into which a light transmitting plate 8 (also see FIG. 7) of a corresponding size and shape is receivable for firmly holding the film 110 on the window 11. Without the holding pressure applied on the film 110 by the plate 8, the film 110 may become wrinkling or distorted during the scanning process where the image scanner 10 is forcibly moved through the surface of the film 110.

The film holding plate 8 may have a thickness substantially corresponding to the height of the step 802. To eliminate the interference ring occurring on the window 11, an outer surface of the window 11 which faces outward and on which the film 11 is directly placed is made with a frosted surface. The frosting of the outer surface of the window plate and that of the light guide plate 42 effectively eliminate the interference ring phenomenon.

Preferably, the film holding plate 8 is made of transparent or translucent material with a frosted surface. The frosted surface of the film holding plate 8, when in contact with the frosted outer surface of the illuminating window 11, effectively eliminates the interference ring occurring therebetween.

Figure 8:
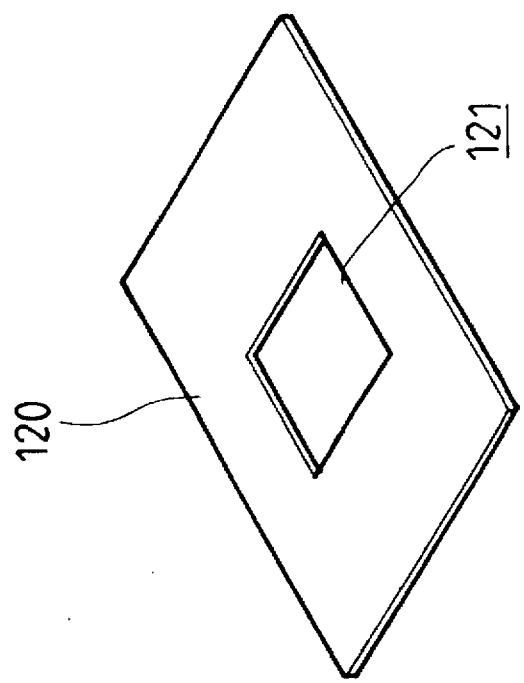
FIGS. 7 and 8 show film holding plates of different embodiments.

In FIG. 8, another embodiment of the film holding plate is illustrated which is used with films of smaller sizes. The second embodiment of film holding plate is designated with reference numeral 120 and is generally an opaque plate having a light transmitting window 121. The opaque portion of the plate 120 blocks light from the illuminating window 11 from reaching the image scanner 10. This allows a reduction in the memory size required for storing the image obtained by the image scanner 10 and since such a method is well known to those skilled in the art, no detail is needed herein.

Preferably, the light transmitting window of the second embodiment film holding plate is frosted and disposed such that it is in contact with the film or the illuminating window 11 of the back lighting device 900 to eliminate any interference ring.

Figure 3:
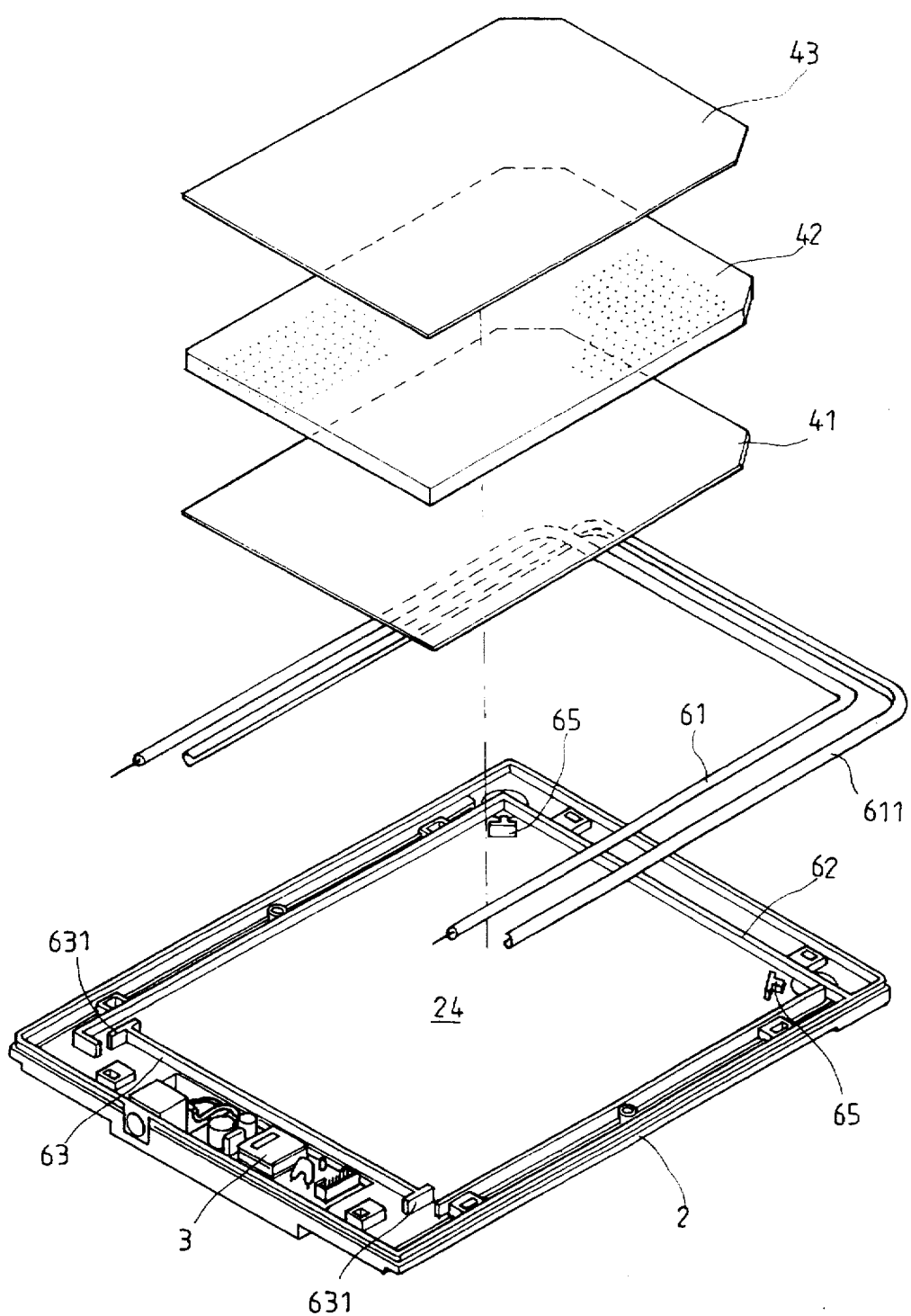
FIG. 3 is an exploded perspective view of a portion of a back lighting device constructed in accordance with a second embodiment of the present invention.
Figure 4:
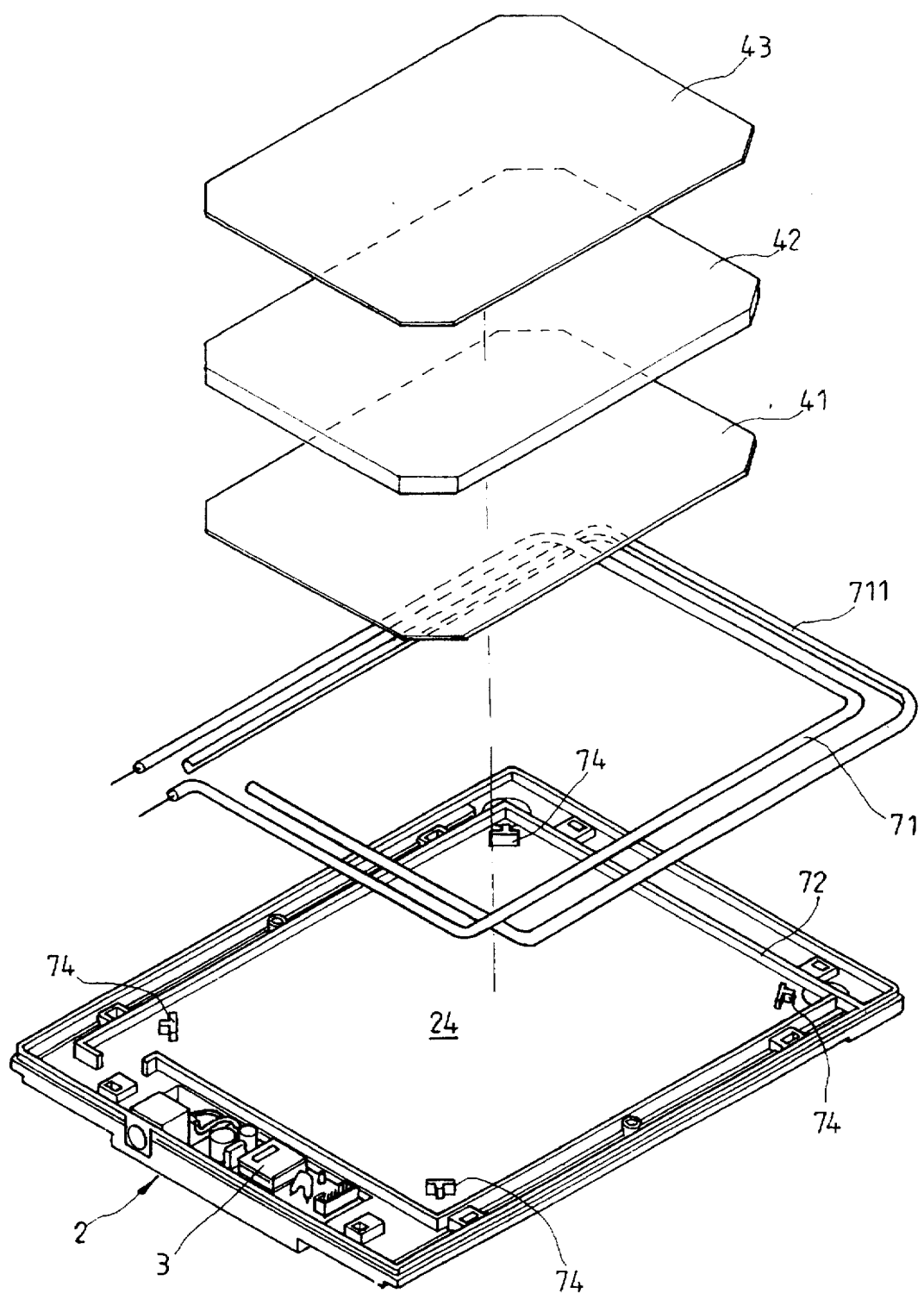
FIG. 4 is an exploded perspective view of a portion of a back lighting device constructed in accordance with a third embodiment of the present invention.

In FIGS. 3 and 4, two further embodiments of the present invention are shown which, respectively, comprise U-shaped and rectangular illuminating members 61 and 71. In the embodiment illustrated in FIG. 3, the U-shaped illuminating member 61 is arranged and retained between wall segments 62, 63 and 65 mounted to the bottom 24 of the second casing member 2. The wall segment 62 is substantially U-shaped to be coextensive with the U-shaped illuminating member 61. At two corners of the U-shaped wall segment 62, a T-shaped wall segment 65 is disposed to define gaps therebetween for receiving and retaining the U-shaped illuminating member 61. The third wall segment 63 has two end tabs 631, located corresponding to two ends of the U-shaped wall segment 62 to define therebetween gaps for receiving and retaining the illuminating member 61.

A U-shaped light reflection member 611 with U-shaped section is placed between the U-shaped illuminating member 61 and the wall segment 62 to partially encase the illuminating member 61 for reflecting the light generated by the illuminating member 61 toward the light diffusion means.

In the embodiment illustrated in FIG. 4, the rectangular illuminating member 71 is arranged and retained between wall segments 72 and 74 mounted to the bottom 24 of the second casing member 2. The wall segment 72 is substantially rectangular to be coextensive with the rectangular illuminating member 71. At the four corners of the rectangular wall segment 72, a T-shaped wall segment 74 is disposed to define gaps therebetween for receiving and retaining the rectangular illuminating member 71.

A rectangular light reflection member 711 with U-shaped section is placed between the U-shaped illuminating member 71 and the wall segment 72 to partially encase the illuminating member 71 for reflecting the light generated by the illuminating member 71 toward the light diffusion means.

The embodiments illustrated in FIGS. 3 and 4 provide more intensive illuminance which may provide for different illuminance requirements.

It is apparent that although the invention has been described in connection with preferred embodiments, it is contemplated that those skilled in the art may make changes to the preferred embodiments without departing from the scope of the invention as defined in the appended claims.

What is claimed is:

1. A back lighting device adapted to be used with an image scanner for reading an image recorded on a light transmitting recording medium, the back lighting device comprising:

a casing having a first face, the first face including an illuminating window formed thereon to support the recording medium, the casing having a recessed end portion formed on a longitudinal end;

a light generating element disposed in the casing and adapted to permit uniform light to go through the illuminating window and the recording medium such that the image of the recording medium is projected to the image scanner; and a cover member having a first surface which is substantially flat and an opposite second surface on which two opposite spaced walls are formed, each wall having a slot formed thereon to receive one of two opposite reduced lateral side edges of the casing such that the cover is releasably mounted to the casing with the second surface of the cover shielding and protecting the illuminating window of the casing, the recessed end portion of the casing being partially inserted between the walls of the cover and engaged by the slots of the walls such that the flat, first surface of the cover is substantially flush with the first face of the casing to serve as an extension thereof.

2. The back lighting device as claimed in claim 1, wherein each of the walls of the cover comprises a plurality of semi-circular projections.

3. A back lighting device adapted to be used with an image scanner for reading an image recorded on a light transmitting recording medium, the back lighting device comprising:

a casing having a first face;

an illuminating window formed on the first face and adapted to support the recording medium, the illuminating window including a circumferential step surrounding the window so as to define a recessed area;

a light generating element disposed in the casing and adapted to permit uniform light to go through the illuminating window and recording medium such that the image of the recording medium is projected to the image scanner; and a holding plate at least partially formed of a light transmitting material, the holding plate being adapted to be receivable in the recessed area of the illuminating window and to firmly hold the recording medium between the holding plate and the illuminating window.

4. The back lighting device as claimed in claim 3, wherein the illuminating window comprises a frosted outer surface on which the recording medium is placed.

5. The back lighting device as claimed in claim 4, wherein the light transmitting portion of the holding plate has a frosted surface to be placed adjacent the outer surface of the illuminating window.

6. The back lighting device as claimed in claim 3, wherein the holding plate is completely made of a light transmitting material.

7. The back lighting device as claimed in claim 3, wherein the holding plate is made of an opaque material with a centered opening defining a light transmitting window.

8. The back lighting device as claimed in claim 1, wherein the light generating means comprises a tubular illuminating member and wherein the casing comprises a first member and a second member secured together to define therebetween an interior space for receiving the light generating means, the first casing member having an opening formed thereon to define the illuminating window, the second casing member having a first wall segment and at least one second wall segment mounted to an inside surface of the second casing member to define therebetween a gap for receiving and retaining therein the tubular illuminating member.

9. The back lighting device as claimed in claim 8, wherein the tubular illuminating member comprises a cold cathode fluorescent lamp.

10. The back lighting device as claimed in claim 8, wherein the tubular illuminating member comprises an L-shaped member and wherein the first wall segment is L-shaped to correspond to the L-shaped illuminating member, the L-shaped first wall segment having a joint corner and two remote ends, the second wall segment comprising a T-shaped member arranged at the joint corner to define a gap with the joint corner of the first wall segment, the second casing member further comprises a third wall segment having two end tabs arranged corresponding to the remote ends of the first wall segment to define gaps with the remote ends for receiving and retaining the L-shaped illuminating member therein.

11. The back lighting device as claimed in claim 8, wherein the tubular illuminating member comprises a U-shaped member and wherein the first wall segment is U-shaped to correspond to the U-shaped illuminating member, the U-shaped first wall segment having two joint corners and two remote ends, the second wall segment comprising two T-shaped members respectively arranged at the joint corners to define gaps with the joint corners of the first wall segment, the second casing member further comprises a third wall segment having two end tabs arranged corresponding to the remote ends of the first wall segment to define gaps with the remote ends for receiving and retaining the U-shaped illuminating member therein.

12. The back lighting device as claimed in claim 8, wherein the tubular illuminating member comprises a rectangular member and wherein the first wall segment is substantially rectangular to correspond to the rectangular illuminating member, the rectangular first wall segment having four corners, the second wall segment comprising four T-shaped members respectively arranged at the corners to define gaps with the corners of the first wall segment for receiving and retaining the tubular illuminating member therein.

13. The back lighting device as claimed in claim 8, wherein the light generating means further comprises a light diffusion plate and a light guide plate disposed substantially corresponding to the illuminating window to conduct light generated by the light generating means toward the illuminating window.

14. The back lighting device as claimed in claim 13, wherein the light generating means further comprises a light reflective plate disposed between the second casing member and the light guide plate.

15. The back lighting device as claimed in claim 10, wherein the light generating means comprises a substantially U-sectioned light reflecting member arranged between the L-shaped illuminating member and the L-shaped first wall segment.

16. The back lighting device as claimed in claim 11, wherein the light generating means comprises a substantially U-sectioned light reflecting member arranged between the U-shaped illuminating member and the U-shaped first wall segment.

17. The back lighting device as claimed in claim 12, wherein the light generating means comprises a substantially U-sectioned light reflecting member arranged between the rectangular illuminating member and the rectangular first wall segment.

* * * * *